June 27, 1961 R. W. KETCHLEDGE 2,990,505
POSITION CONTROL SYSTEM
Filed Dec. 17, 1958
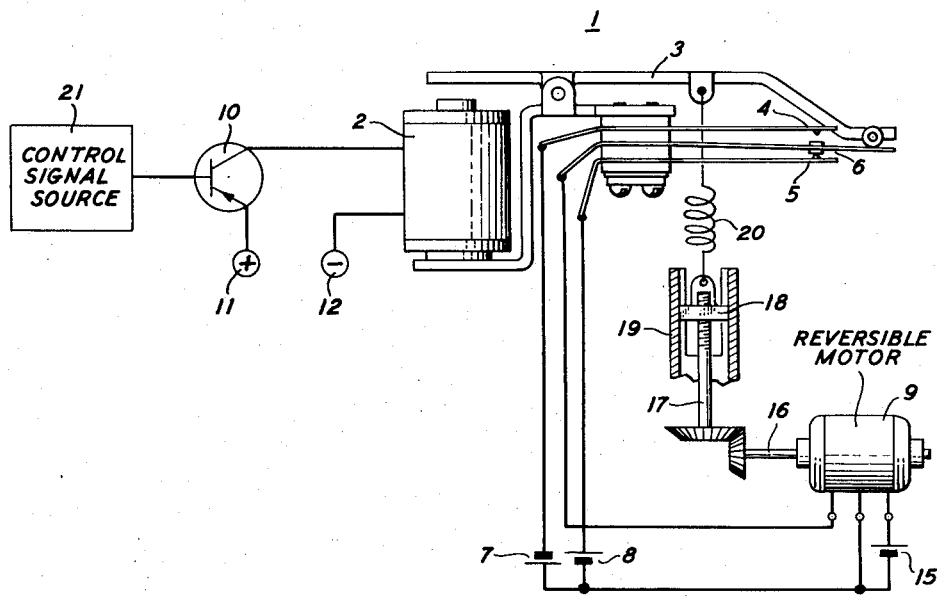
INVENTOR
R. W. KETCHLEDGE
BY
R. C. Winter
ATTORNEY United States Patent Office 2,990,505
Patented June 27, 1961

2,990,505
POSITION CONTROL SYSTEM
Raymond W. Ketchledge, Whippany, N.J., assignor to Bell Telephone Laboratories, Incorporated, New York, N.Y., a corporation of New York
Filed Dec. 17, 1958, Ser. No. 781,012
13 Claims. (Cl. 318—32)

This invention relates to servomechanisms and more particularly to servomechanisms employing a two-state electromechanical device in the control loop.

A servomechanism is fundamentally a closed cycle system, that is, a system which compares some quantity with a reference and then takes steps to correct the quantity if a difference exists.

Various arrangements are known in the art for controlling electric motors to produce a particular angular rotation or shaft position in response to a predetermined control signal. Many such motor control arrangements may be classified as servomechanisms since they include some means for comparing the degree of rotation or angular position of the motor shaft with the control signal or with the desired degree of rotation or position corresponding thereto and for utilizing the result of such a comparison to determine whether the motor shaft is positioned as desired.

Such motor controlling servomechanisms as are known are relatively complex since they usually require an electrical signal generator driven by the motor, a comparison circuit for comparing the generated position signal with the control signal, and some means for directing the derived difference signal to the motor. Furthermore, it has not heretofore been known to employ a two-state device such as a relay to provide continuous control of a motor within a range between the limits of travel of the motor shaft.

In many applications of motor control circuits of the type described above which comprise a feedback path for comparing the motor shaft position with an input signal, a high degree of precision of motor shaft position control is not required. However, to provide a feedback loop as described for priorly known servomechanisms still requires a certain number of separate components with a corresponding degree of complexity in the overall combination.

It is an object of this invention to provide an improved servomechanism. More specifically, it is an object of this invention to reduce the complexity of a servomechanism with a corresponding reduction in cost and weight of the required components.

It is also an object of this invention to provide a servomechanism which is capable of producing a predetermined output in the event that there is an interruption of the servomechanism control signal.

Briefly this invention comprises a reversible electrical motor, a pair of oppositely poled voltage sources and a relay for alternatively connecting these sources to the motor. The relay coil current is controlled by a predetermined signal corresponding to a desired position of the element driven by the electric motor.

As is well known, the pull-in and drop-out values of coil current, that is, the values of coil current for which the relay armature moves from one stationary contact to the other, depend upon the tension of the spring pulling the armature toward the back contact. In accordance with this invention, the feedback loop of the servomechanism is completed by a connection between the relay armature spring and the element which is driven by the electric motor. This arrangement in effect varies the pull-in and drop-out currents of the relay to correspond to the applied signal from the control signal source.

In a manner which will be described in detail below, the relay, in response to a particular control signal, causes the motor to run until the desired position of the driven element is reached, after which the relay armature moves back and forth between the two stationary contacts, thereby causing the motor to repeatedly reverse its direction of rotation and maintain the position of the driven element within some predetermined increment of the desired position.

In accordance with one aspect of the invention, should there be any failure in the circuit which controls the relay coil current, the motor continues to run until the driven element reaches one or the other of the limits of its travel.

It is a feature of this invention that an electromechanical relay having two contact positions be included in a servomechanism to provide essentially continuously variable control of the position of an element driven by an electric motor.

It is also a feature of this invention that a relay used to control the application of driving potentials to an electric motor have its armature tension controlled by the motor shaft.

It is another feature of this invention that a relay have its armature tension varied in accordance with a position of an element which is controlled by the relay.

More specifically, it is a feature of this invention that a spring be connected between the armature of a motor-controlling relay and the motor shaft to complete the feedback loop of a servomechanism.

It is an additional feature of this invention that a relay control the position of a particular element by causing the element to be moved back and forth about a desired position corresponding to a predetermined value of relay coil current.

It is a further feature of this invention that a driven element, the position of which is controlled by a relay in response to a control signal, be driven to a predetermined position in the event of an interruption of such a signal.

A complete understanding of this invention and of these and other features thereof may be gained from the following detailed description together with the accompanying drawing which is a schematic representation of the invention.

In the drawing a relay 1 is shown having a coil 2, an armature 3, a pair of stationary contacts 4 and 5 and a movable contact 6. The current through the coil 2 is established by a suitable current-controlling device which in the depicted embodiment is the transistor 10. The coil 2 and the transistor 10 comprise a circuit between two voltage terminals 11 and 12. A control signal source 21 is shown connected to the transistor 10 to control the current in the coil 2 and, thereby, the magnetic field of the relay.

Connected to the stationary contacts 4 and 5 is a pair of oppositely poled voltage sources 7 and 8, respectively, which in turn have a common connection with one terminal of a reversible motor 9. Another connection is provided between the movable contact 6 and a second terminal of the motor 9. Another voltage source 15 is connected between the first-mentioned terminal of the motor 9 and a third terminal thereof. This arrangement causes the motor shaft 16 to rotate in one direction or the other depending on which of the voltage sources 7 and 8 is connected in circuit with the motor through the movable contact 6 and a stationary contact 4 or 5, respectively.

The drawing further shows a threaded shaft 17 geared to the motor shaft 16. The shaft 17, by rotating, moves an element 18 vertically within the guide device 19. The element 18 represents any device which is desired to be driven by the motor 9. The position of the element 18 may be considered the output of the servomechanism. Between the armature 3 and the element 18 is shown a spring 20, the tension of which is varied according to the location of the element 18.

By means of this arrangement, in accordance with the invention, the spring force tending to return the movable contact 6 to the back contact 5 is determined by the position of element 18 as described more fully hereinafter. The respective polarities of the voltage sources 7, 8 and 15 of the windings of the motor 9 are such that when voltage source 8 is in circuit with motor 9, the element 18 is driven toward the armature 3, thereby reducing the tension on the armature. On the other hand, when the voltage source 7 is connected to drive the motor 9, the element 18 is driven away from the armature 3, thereby increasing the spring tension on the armature.

In the operation of the circuit depicted in the drawing a particular signal is applied from the control signal source 21. In response to this signal the transistor 10 causes a particular value of current to flow in the relay coil 2. If the movable contact 6 is at the contact 5 as shown in the drawing, the voltage source 8 is connected to drive the motor 9 in a direction which moves the element 18 toward the armature 3 as described above. As the element 18 moves, eventually the tension on the armature 3 is reduced to the point where the magnetic force resulting from the current in coil 2 moves the armature to its other position, thus moving the movable contact 6 over to the stationary contact 4. This removes voltage source 8 from the motor circuit and applies the oppositely poled voltage source 7 thereto, thus reversing the motor 9. The resulting reversal of the rotation of shafts 16 and 17 drives the element 18 away from the armature 3. This movement increases the spring tension on the armature 3 until the magnetic field of coil 2 is overcome and the armature returns to its depicted position, thus moving the contact 6 back to the stationary contact 5 and initiating the next cycle. In this manner, it can be seen that the position of the driven element 18 is caused to vary back and forth about the particular spot which corresponds to the applied signal from control signal source 21.

If now a new signal is applied from the control source 21, thereby producing a different current in the coil 2, the element 18 is moved until it overshoots the desired output position. At this time, the armature 3 changes its position, moving the contact 6 to the opposite stationary contact and initiating the cycling of the servomechanism as described above. In this manner in accordance with one aspect of the invention the relay 1, which is essentially a two-position control device, serves to provide a continuously variable control of the position of the driven element 18.

One application for which this invention is particularly suited is in the positioning of the control surfaces of a radio-controlled model airplane. In such an application, simplicity of design and minimum weight are essential. It will be appreciated that the strength of the signal from the remotely located transmitter is necessarily limited. In such a use if the signal at the model airplane's receiver fails either because of an apparatus failure or, what is more likely, because the airplane flies out of radio range of the transmitter, it is desired that the plane be caused to turn around rather than fly off and be lost.

Therefore, in accordance with another aspect of this invention, the motor 9 drives the element 18 to a predetermined position if the control signal is interrupted. It can be seen from a consideration of the above description of the servomechanism operation that when the signal from the control signal source 21 is interrupted, the transistor 10 ceases to conduct current. The lack of current through the coil 2 permits the armature and contact 6 to assume the position shown in the drawing with the result that the motor 9 continues to run until the element 18 reaches the limit of its permissible travel in that direction. If the element 18 is attached to the plane's rudder, the rudder is directed to a position which would cause the plane to turn in a circle.

If, on the other hand, there is some failure of the transistor 10 so that it becomes shorted, for example, and fails to respond to signals from the control signal source 21, a high value of current is then directed through the coil 2. This high current produces a strong magnetic field which maintains the armature 3 in the opposite position from that depicted in the drawing, thus causing the motor 9 to drive the element 18 in the opposite direction until the other limit of travel is reached. The described motion of the element 18 drives the plane's rudder to its other extreme and again the plane is directed in a circle. In either event, the plane is directed within a limited general area rather than permitted to fly in a straight line. Thus, this invention not only provides a simple and economical servo-mechanism arrangement but incorporates a desirable safety feature which produces a predetermined response in the event of the failure of the control section of the servo-mechanism.

It is to be understood that the above-described arrangements are illustrative of the principles of the invention. Numerous other arrangements may be devised by those skilled in the art without departing from the spirit and scope of the invention.

What is claimed is:

1. A servomechanism for controlling a displacement in response to an electrical signal comprising electro-mechanical relay means having a movable contact and a pair of stationary contacts on opposite sides of said movable contact, a reversible driving means, a pair of oppositely poled voltage sources, means for continuously oscillating said driving means comprising means including said contacts for connecting said sources alternatively in circuit with said driving means, and means connecting the output of said driving means to said relay for varying the position of said movable contact in response to the movement of said driving means.

2. A servomechanism comprising an electromechanical relay having a plurality of contacts and a current carrying coil for controlling relative movement of said contacts, a reversible motor, a mechanical spring, a pair of oppositely poled voltage sources, circuit means including said relay contacts for alternatively connecting said sources to said motor to reverse successively the direction of rotation thereof continuously, mechanical means including said spring connecting the shaft of said motor with one of said relay contacts for varying the force applied to said one relay contact in accordance with the angular position of said motor shaft, and means for producing a predetermined current in said relay coil.

3. A servomechanism system comprising a control signal source, a motor, an element driven by said motor and means for controlling said motor from said signal source to position said element, said control means comprising a relay having a pair of fixed contacts and an armature connected to said motor, means including energization of said relay by a predetermined signal from said signal source for moving said armature toward one of said fixed contacts, a distinct voltage source connected between each of said fixed contacts and said motor for continuously operating said motor successively in opposite directions upon contact of said armature and said fixed contacts, and means connected between said element and said armature for moving said armature toward the other of said fixed contacts.

4. A servomechanism system as set forth in claim 3 wherein said last-mentioned means comprises elastic means for constraining said armature against said other fixed contact in the event of the interruption of the signal from said control signal source.

5. A servomechanism system comprising a reversible electric motor, a pair of oppositely poled voltage sources connected to said motor, a mechanical spring, an element driven by said motor, alternative switching means for connecting one or the other of said voltage sources in circuit with said motor, said switching means operable to energize said motor continuously from said voltage sources, means for operating said switching means in one manner in response to a control signal, and means including said spring connecting said element and said switching means for operating said switching means in the alternative manner when said motor has driven said element past the position corresponding to said control signal.

6. A servomechanism as set forth in claim 5 wherein said means connecting said element and said switching means includes means for driving said element to a predetermined position in the event of the interruption of said control signal.

7. A positioning system comprising a motor, a shaft to be positioned connected to said motor, a pair of oppositely poled voltage sources, a relay having an armature and contacts, and means for alternatively connecting said voltage sources to said motor through said relay contacts to oscillate said shaft about a selected position, said last-mentioned means comprising means connected to said shaft for applying a variable force to said armature tending to restrain said armature at one of said contacts, a source of a selectable magnitude control signal, the magnitude of which corresponds to said selected position, and means for applying said signal from said source to said relay tending to move said armature to the other of said contacts so that said shaft oscillates about said selected position.

8. An arrangement for determining the position of a motor shaft comprising a motor, a pair of voltage sources, switching means for alternatively connecting said voltage sources to said motor, mechanical means for restraining said switching means in a first position to connect one of said voltage sources to said motor, magnetic field producing means for restraining said switching means in a second position to connect the other of said voltage sources to said motor, means connected to the shaft of said motor for adjusting said mechanical means in accordance with the position of said shaft, and input means for controlling the magnitude of said magnetic field, said one voltage source being connected to said motor in a manner to rotate said motor shaft in a direction to reduce the mechanical restraint on said switching means and said other voltage source being connected to said motor in a manner to rotate said motor shaft in a direction to increase the mechanical restraint on said switching means so that said motor shaft oscillates about a distinct position in accordance with the controlled magnitude of said magnetic field.

9. An arrangement as set forth in claim 8 wherein said input means includes a control signal source and a transistor connected between said signal source and said magnetic field producing means.

10. An arrangement as set forth in claim 8 wherein said shaft-connected means comprises means for moving said shaft to another distinct position in the event of a malfunction of said input means.

11. A servomechanism for positioning an element comprising a relay including an armature and a pair of springs, means for energizing said relay to urge said armature into contact with one of said springs, a motor connected to said armature, a first voltage source connected between said one spring and said motor for rotating the drive shaft of said motor in one direction upon contact of said armature with said one spring, an element linked to the drive shaft of said motor for movement in a direction determined by the direction of rotation of said drive shaft, elastic means connected between said element and said armature for urging said armature into contact with the other one of said springs in response to rotation of said drive shaft in said one direction to a selected position, and a second voltage source connected between said other spring and said motor for rotating said drive shaft in the opposite direction upon contact of said armature with said other spring thereby oscillating said drive shaft about said selected position.

12. An arrangement for determining the position of a motor shaft in response to an electrical control signal comprising a reversible motor, a pair of oppositely poled voltage sources, switching means for alternatively connecting said voltage sources to said motor to oscillate said shaft about a desired position, mechanical means for applying a force to said switching means to connect one of said voltage sources to said motor, means for producing a magnetic field to apply a counterforce to said switching means, means attached to the shaft of said motor for adjusting said mechanical means in accordance with the position of said motor shaft, and amplifying means for controlling said magnetic field in correspondence with said electrical control signal.

13. An arrangement as set forth in claim 12 wherein said amplifying means comprises a transistor.

References Cited in the file of this patent
UNITED STATES PATENTS

| | | |
|---|---|---|
| 2,667,610 | Schmitt | Jan. 26, 1954 |
| 2,798,191 | Brailsford | July 2, 1957 |
| 2,851,644 | Ferguson | Sept. 9, 1958 |
| 2,862,169 | Yragui | Nov. 25, 1958 |
| 2,886,751 | Gilbert | May 12, 1959 |